United States Patent [19]
Tominaga

[11] Patent Number: 4,765,997
[45] Date of Patent: Aug. 23, 1988

[54] METHOD OF CONTROLLING THE ODOR OF LIQUID CONDIMENTS

[75] Inventor: Yasunori Tominaga, Tokyo, Japan

[73] Assignee: Live International Co., Ltd., Tokyo, Japan

[21] Appl. No.: 86,786

[22] Filed: Aug. 19, 1987

[30] Foreign Application Priority Data

Oct. 4, 1986 [JP] Japan ................ 61-236647

[51] Int. Cl.$^4$ .................. C12H 1/04; A23L 1/221
[52] U.S. Cl. ..................... 426/422; 426/330; 426/488
[58] Field of Search ............ 426/422, 423, 487, 488, 426/330, 330.5, 426

[56] References Cited

U.S. PATENT DOCUMENTS 4,594,250 6/1986 Lautenschlaeger ............... 426/422

FOREIGN PATENT DOCUMENTS 55-40236 10/1980 Japan ................................. 426/422
58-175473 10/1983 Japan ................................. 426/423

Primary Examiner—George Yeung
Attorney, Agent, or Firm—Oblon, Fisher, Spivak, McClelland & Maier

[57] ABSTRACT

A method of controlling the odor of liquid condiments such as soy sauce, vinegar, mayonnaise sauce, Worcestershire sauce and catsup. By using a highly osmotic substance, the odor of liquid condiments is controlled with ease and efficiency while leaving their natural properties unspoiled, without causing such degeneration as might result when additive is employed. A dehydrating sheet comprising semi-permeable external membranes and a highly osmotic substance sealed therebetween is immersed in such liquid condiments for absorbing and removing the unwanted odor-emitting substances contained in them.

6 Claims, 1 Drawing Sheet

METHOD OF CONTROLLING THE ODOR OF LIQUID CONDIMENTS

FIELD OF THE INVENTION

This invention relates to a method of controlling the odor of liquid condiments such as soy sauce, vinegar, mayonnaise sauce, Worcestershire sauce and catsup.

BACKGROUND OF THE INVENTION

Japanese, Western, Chinese and many other dishes use various kinds of liquid condiments such as soy sauce, vinegar, mayonnaise sauce, Worcestershire sauce and catsup having unique odors and flavors. With not a few dishes, however, it is preferable to make the most of the natural flavors of their materials by subdueing the odor of the condiments used with them as much as possible, depending on the kind of materials, type of seasoning and preference of individuals.

On such occasions, the odor of a liquid condiment is eliminated or moderated by adding spices, seasonings and/or other similar substances. Such additives, however, are not always preferable because they can sometimes deteriorate liquid condiments, spoiling their original flavors and properties.

SUMMARY OF THE INVENTION

A principal object of this invention is to provide a method of surely controlling only the door of a liquid condiment while maintaining its original properties, without causing any such degeneration of the liquid condiment as might result from the use of an additive.

Another object of this invention is to provide a method of achieving the above odor control with ease and high efficiency using a highly osmotic substance.

The above objects of this invention are achieved by immersing a dehydrating sheet, which comprises semi-permeable external membranes and a highly osmotic substance sealed therebetween, in liquid condiments such as soy sauce, vinegar, mayonnaise sauce, Worcestershire sauce and catsup. The dehydrating sheet placed in a liquid condiment absorbs and removes odor-emitting substances contained therein.

The combination of the highly osmotic substance and semi-permeable external membrane causes the odor-emitting substances, such as esters and aldehydes, to pass, together with water, through the membranes into the highly osmotic substance, thereby partially or completely removing the unwanted odor of the liquid condiment in which the dehydrating sheet is immersed. Thus the desired odor control can be achieved with ease and efficiency while leaving the natural flavor of the liquid condiment unspoiled, without using any additive that might cause undesirable degeneration.

DESCRIPTION OF THE PREFERRED EMBODIMENT

Figure 1:
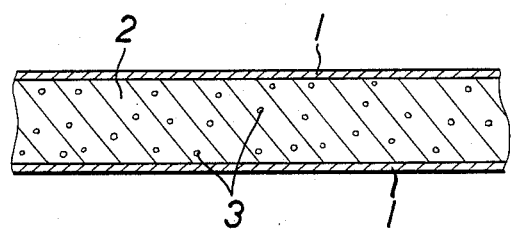
FIG. 1 is a cross-sectional view showing a preferred embodiment of a dehydrating sheet according to this invention.

The following is a detailed description of an odor controlling method according to this invention.

The odor controlling method of this invention is applicable to whatever kind of liquid condiments, such as soy sauce, vinegar, mayonnaise sauce, Worcestershire sauce and catsup, of whatever viscosity.

To achieve the desired odor control, a dehydrating sheet of this invention is immersed in a liquid condiment held in a container.

The dehydrating sheet of this invention comprises external membranes 1 of a semi-permeable substance, such as cellophane paper, that allows only such odor-emitting substances composed of smaller molecules as esters and aldehydes in the solutes contained in the liquid condiment being treated to pass through together with water, as shown in FIG. 1. Between the external membranes 1 are sealed a highly osmotic substance 2 causing the above osmosis, such as an aqueous solution of cane sugar, and a high-molecular absorbent 3, composed of polymers of acrylic acids etc., to absorb and hold the odor-emitting substances and water having moved into the highly osmotic substance 2. When the dehydrating sheet is immersed, the odor-emitting substances contained in the liquid condiment passes into the highly osmotic substance 2 together with water under the influence of the osmosis of the highly osmotic substance 2 and external membranes 1, thus getting removed from the solvent.

Because some water is also removed at the same time, the concentration of the liquid condiment increases slightly. But the concentration can be readjusted by adding make-up water or other diluent as needed.

Faster and more efficient deodorization can be achieved by using a larger dehydrating sheet that comes in contact with the liquid condiment in a larger area. Winding into a coil form permits using such a larger dehydrating sheet in a small container, too.

As the highly osmotic substance, not only an aqueous solution of cane sugar but also one containing many other types of sugars, such as fruit, grape and malt sugars, either singly or jointly, can be used. Also, an aqueous solution of salt can be used singly or together with one or more of the sugar solutions just mentioned. Addition of glycerol further increases the osmotic pressure.

The external membrane consists of a semi-permeable substance which allows mainly such odor-emitting substances as esters and aldehydes composed of smaller molecules to pass therethrough. Examples of such semi-permeable membranes are cellophane paper, parchment paper and waterproof film of polyvinyl alcohol.

The following example illustrates the practice of this invention.

EXAMPLE

A commercially available dehydrating agent (500 mm by 350 mm) of the structure shown in FIG. 1 was immersed in 1 liter of soy sauce for 3 hours.

By means of weight comparison, the soy sauce after the removal of the dehydrating sheet proved to have been dehydrated by approximately 5 percent (by weight) and, therefore, concentrated by the same percentage.

The dehydrated soy sauce smelled less than the undehydrated one notwithstanding the increased concentration, evidencing that the desired odor control was achieved as a result of deodorization that took place simultaneously with dehydration.

What is claimed is:

1. A method of controlling the odor of liquid condiments selected from the group consisting of soy sauce, vinegar, mayonnaise sauce, Worchestershire sauce and catsup, which comprises the steps of:

immersing a dehydrating sheet in said liquid condiments, the dehydrating sheet comprising semi-permeable external membranes and a solution of an osmotic salt, sugar or mixture thereof therebetween, and absorbing and removing the odor-emitting substance present in the liquid condiments with said dehydrating sheet.

2. The method of claim 1, wherein said sugar solution is a cane sugar solution, a fruit sugar solution, a grape sugar solution or a malt sugar.

3. The method of claim 2, wherein said osmotic solution contains glycerol.

4. The method of claim 1, wherein a high polymer absorbent is added to the osmotic solution.

5. The method of claim 1, wherein said semi-permeable membranes are permeable to odiferous aldehydes and esters.

6. The method of claim 5, wherein said semi-permeable external membranes are selected from the group consisting of cellophane paper, parchment paper and a waterproof film of polyvinyl alcohol.

* * * * *